(12) United States Patent
Hurwitz et al.

(10) Patent No.: US 12,601,369 B2
(45) Date of Patent: Apr. 14, 2026

(54) MODULAR CABLE REPLACEMENT

(71) Applicant: Magnum Shielding Corporation, Pittsford, NY (US)

(72) Inventors: Scott L. Hurwitz, Rochester, NY (US); Christopher J. Hughson, Rochester, NY (US); Ian R. Adey, West Seneca, NY (US)

(73) Assignee: Magnum Shielding Corporation, Pittsford, NY (US)

( * ) Notice: Subject to any disclaimer, the term of this patent is extended or adjusted under 35 U.S.C. 154(b) by 212 days.

(21) Appl. No.: 17/888,049

(22) Filed: Aug. 15, 2022

(65) Prior Publication Data

US 2024/0052864 A1      Feb. 15, 2024

(51) Int. Cl.
*F16C 1/10*          (2006.01)
*B62M 25/02*       (2006.01)

(52) U.S. Cl.
CPC ............. *F16C 1/101* (2013.01); *B62M 25/02* (2013.01)

(58) Field of Classification Search
None
See application file for complete search history.

(56) References Cited

U.S. PATENT DOCUMENTS 5,575,180 A   *   11/1996   Simon ..................... F16C 1/101
                                                              403/329
10,451,103 B2   10/2019   Yoshida et al.

10,830,273 B2   11/2020   Naoi et al.
2008/0178703 A1 *  7/2008   Anderson ................ F16C 1/26
                                                              74/502.4
2009/0175676 A1 *  7/2009   Ficyk ..................... F16C 1/101
                                                              403/123

FOREIGN PATENT DOCUMENTS

JP          2014009708 A       1/2014

OTHER PUBLICATIONS

Screen captures from YouTube video clip entitled "2021 Clutch Cable Extension," 10 pages, uploaded on Mar. 4, 2021 by user "FatbaggersInc". Retrieved from Internet: <https://youtu.be/y0KoemSNI_I>.

* cited by examiner

*Primary Examiner* — Vicky A Johnson
(74) *Attorney, Agent, or Firm* — Brian B. Shaw, Esq.; Harter Secrest & Emery LLP

(57)                    ABSTRACT

The present disclosure provides a cable coupling assembly for releasably coupling a first cable subassembly and a second cable assembly. The second cable subassembly includes a coupler affixed to a core of the second cable subassembly. The coupler is configured to engage a first slug of the first cable assembly in a capture socket of the coupler, wherein the coupler is slidably received within a casing connected to the first cable subassembly. The coupler can be affixed to the core of the second cable subassembly to preclude longitudinal translation or rotation relative to the second core.

19 Claims, 9 Drawing Sheets

Fig. 3
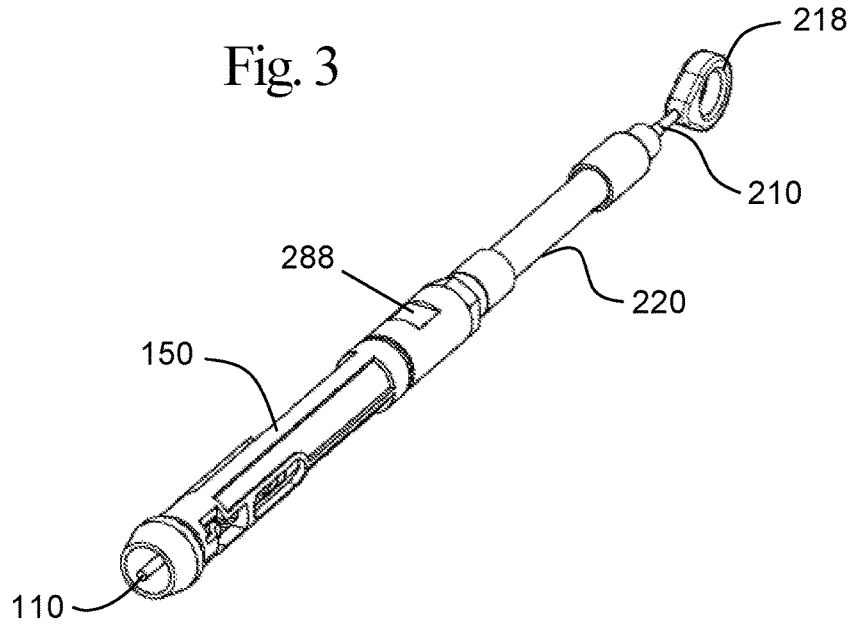
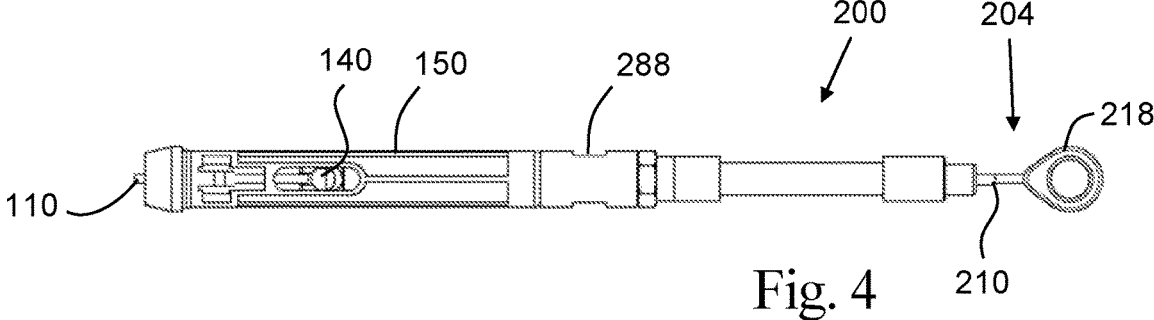
Fig. 4
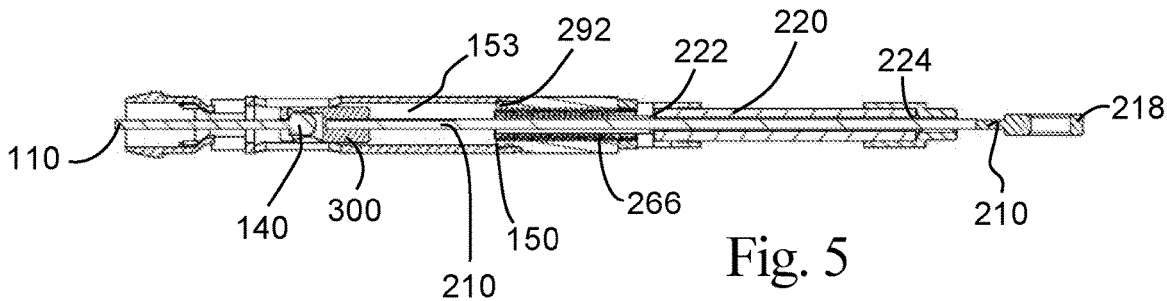
Fig. 5

Fig. 8
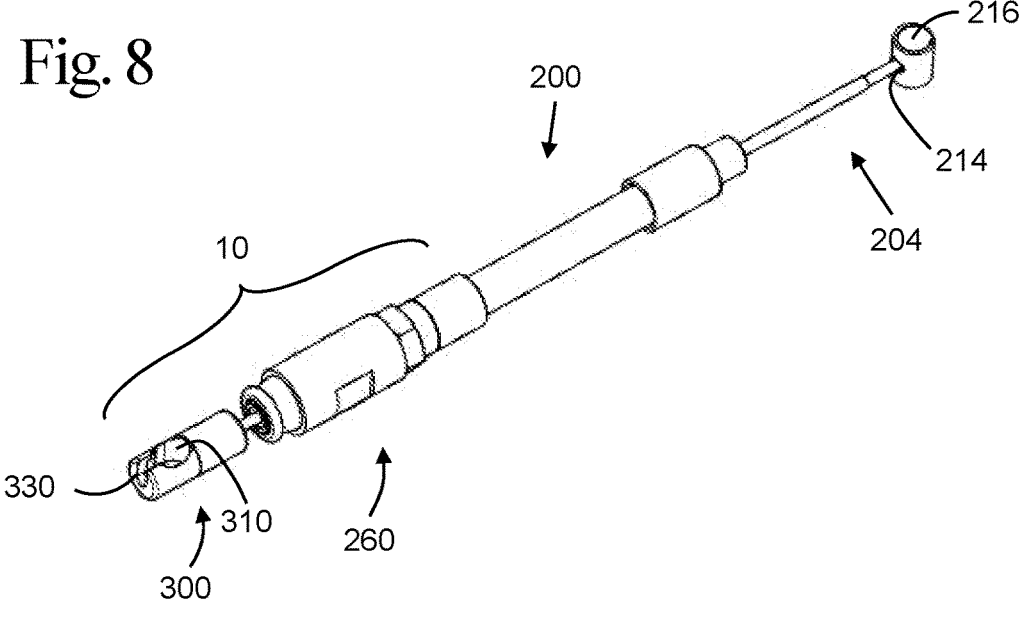
Fig. 9
Fig. 10
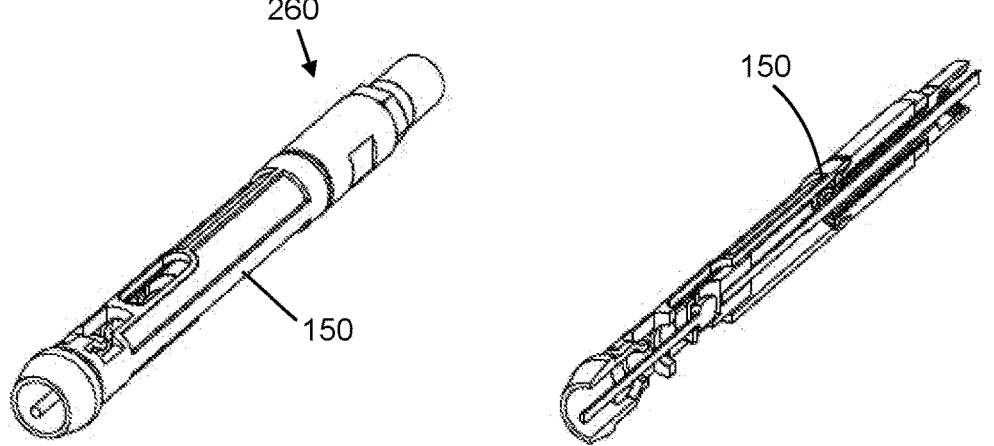

MODULAR CABLE REPLACEMENT

CROSS-REFERENCE TO RELATED APPLICATIONS

None.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present disclosure relates to a cable coupling assembly and particularly to a modular cable coupling assembly, and more particularly to a clutch cable coupling assembly used on and for a motorcycle.

Description of Related Art

Clutch-operated motorcycles have a clutch connected to a gear box for enabling a rider to change gears. Typically, the clutch is actuated through a lever on the handlebar of the motorcycle. When depressed, the clutch lever disengages the clutch and when released again engages the clutch.

In certain motorcycles, the clutch cable is a single length of control cable which is affixed to the transmission and extending to the handlebar. In other motorcycles, the clutch cable is comprised of two individual conduit housings connected by an adjuster assembly with a single length of cable. Thus, if the handlebars are changed, and in particular, if the handlebars are a different height or shape, the entire length of the clutch cable assembly is replaced, which involves disconnecting the cable from the transmission which is a time consuming and complicated process.

The need exists for a system for operably coupling individual lengths of a two piece control cable comprised of two separate control cables sections, wherein a first section is connected to the clutch and interconnects with a second section which extends to the handlebars and the clutch lever. The need further exists for a cable coupling assembly wherein a first section of the assembly can remain operably connected at one end to the transmission (clutch) and selectively couple to the second section of control cable, such that the second section can be readily switched to accommodate different handlebars without requiring disconnection of the first section of control cable from the transmission.

BRIEF SUMMARY OF THE INVENTION

Generally, the present disclosure relates to a cable coupling assembly including a length of a cable subassembly extending along a longitudinal axis, the cable subassembly having a core and a jacket surrounding the core, wherein the core is moveable along the longitudinal axis relative to the jacket, and the cable subassembly including a core first end, a jacket first end, a core second end, and a jacket second end; a longitudinal adjuster having a ferrule component, a compensating component, and a lock; the ferrule component affixed to the jacket first end, the compensating component longitudinally translatable relative to the ferrule component, and the lock configured to operatively retain the ferrule component relative to the compensating component; the compensating component including an engagement interface configured to provide a mechanical connection; and a coupler affixed to the core first end, the coupler including a capture socket and an access passage, wherein the access passage extending along the longitudinal axis from the capture socket to an exterior of the coupler.

The present disclosure further relates to a cable coupling assembly including a length of a first cable subassembly extending along a longitudinal axis, the first cable subassembly having a first core and a first jacket surrounding the first core, wherein the first core is moveable along the longitudinal axis relative to the first jacket; a first ferrule affixed to a first end of the first jacket; a first slug affixed to a first end of the first core; a casing connected to the first ferrule and extending along the longitudinal axis, the casing including an engaging surface spaced from the first ferrule along the longitudinal axis; a length of a second cable subassembly extending along the longitudinal axis, the second cable subassembly having a second core and a second jacket surrounding the second core, wherein the second core is moveable along the longitudinal axis relative to the second jacket, a longitudinal adjuster having a ferrule component, a compensating component, and a lock; the ferrule component affixed to a first end of the second jacket, the compensating component longitudinally translatable relative to the ferrule component, and the lock configured to operatively retain the ferrule component relative to the compensating component; the compensating component including an engagement surface configured to provide a mechanical connection with the engaging surface of the casing; and a coupler sized to pass along the longitudinal axis within the casing, the coupler affixed to the second core and including (i) a capture socket and (ii) an access passage, wherein the capture socket is sized to receive the first slug and the access passage is sized to slidably receive a portion of the first core.

A method is provided for releasably connecting a first cable subassembly and a second cable subassembly, wherein the method includes passing a coupler connected to a core of a second cable subassembly through a length of a casing connected to a ferrule affixed to a jacket of a first cable subassembly; locating a slug affixed to a core of the first cable subassembly within a capture socket in the coupler; and locking a compensating component of a longitudinal adjuster relative to a ferrule component of the longitudinal adjuster to retain the compensating component at given longitudinal position.

BRIEF DESCRIPTION OF THE SEVERAL VIEWS OF THE DRAWING(S)

FIG. 3 is a perspective view of the cable coupling assembly engaging a portion of a second cable assembly FIG. 4 is a top plan view of the cable coupling assembly engaging a portion of a second cable assembly FIG. 5 is a cross sectional view of a side elevational view of the cable coupling assembly of FIG. 4.

FIG. 8 is a perspective view of the further cable coupling assembly in a cable subassembly.

FIG. 9 is a perspective view of a portion of cable coupling assembly.

FIG. 10 is a cross sectional view of the cable coupling assembly of FIG. 9.

Figure 13:
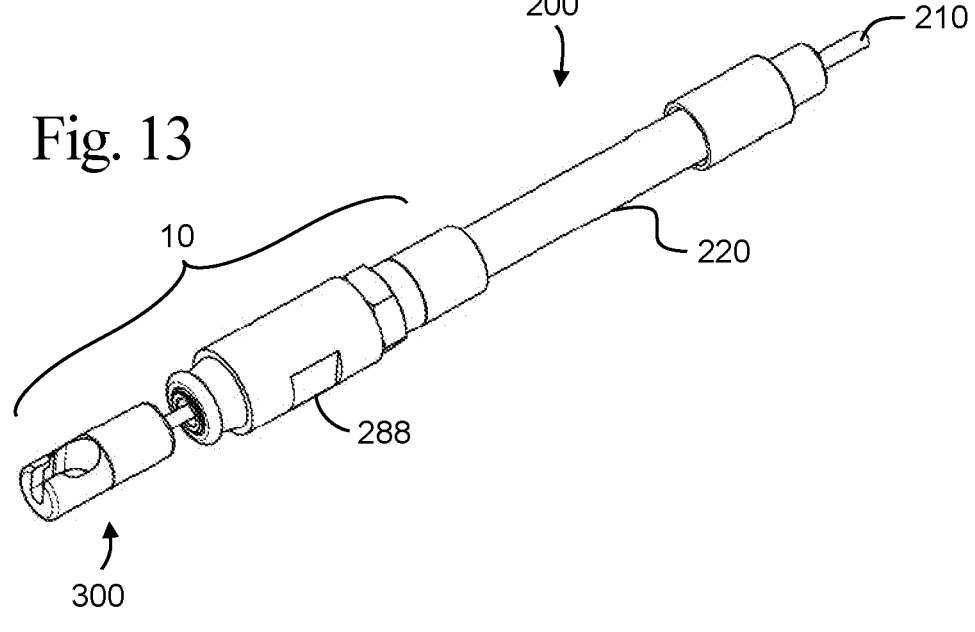

FIG. 13 a perspective view of the cable coupling assembly independent of the first cable subassembly.

Figure 14:
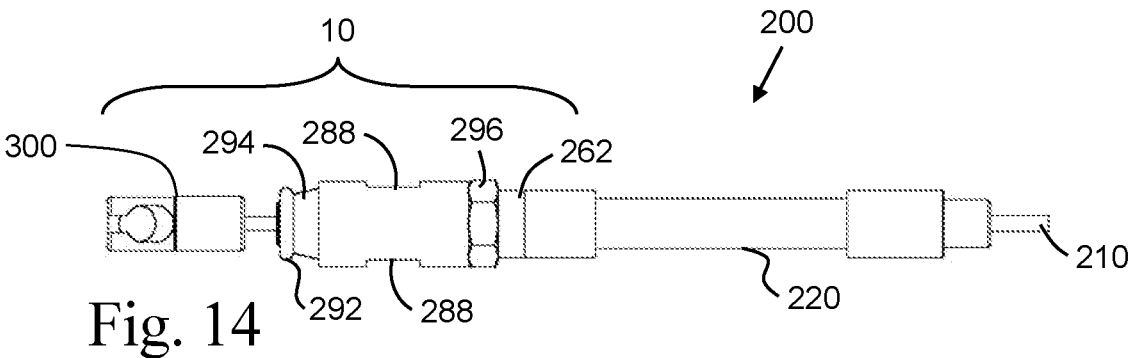

FIG. 14 is a top plan view of the cable coupling assembly of FIG. 13.

Figure 15:
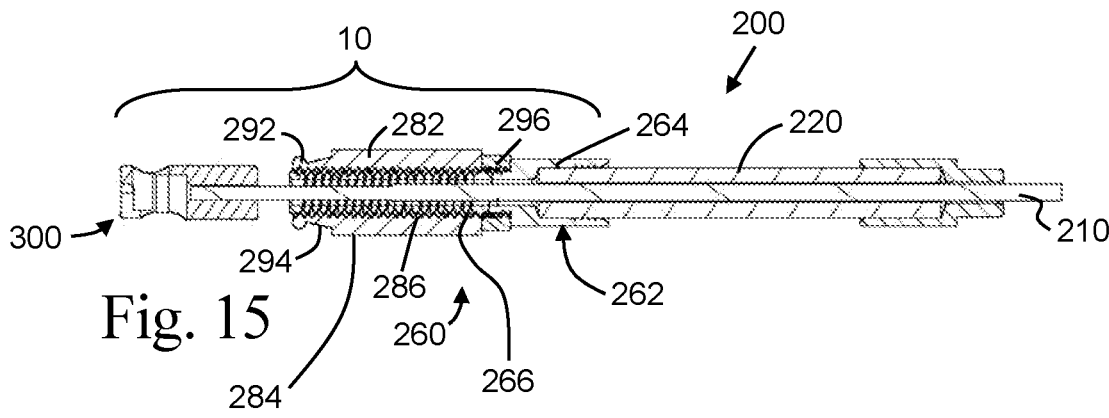

FIG. 15 is a cross sectional view of the cable coupling assembly of FIG. 13.

Figure 16:
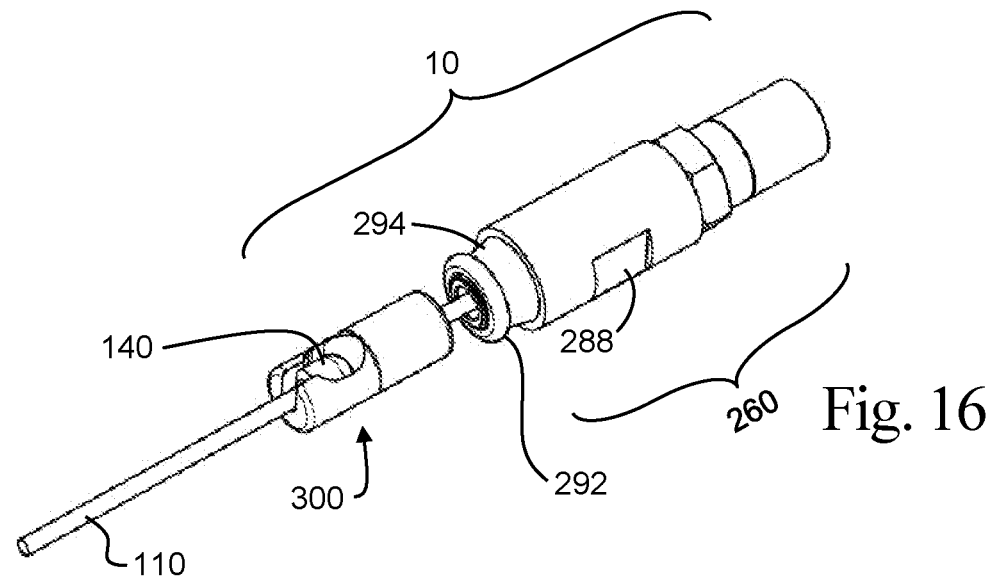

FIG. 16 is a perspective view of the cable coupling assembly engaged with a slug of a cable subassembly.

Figure 17:
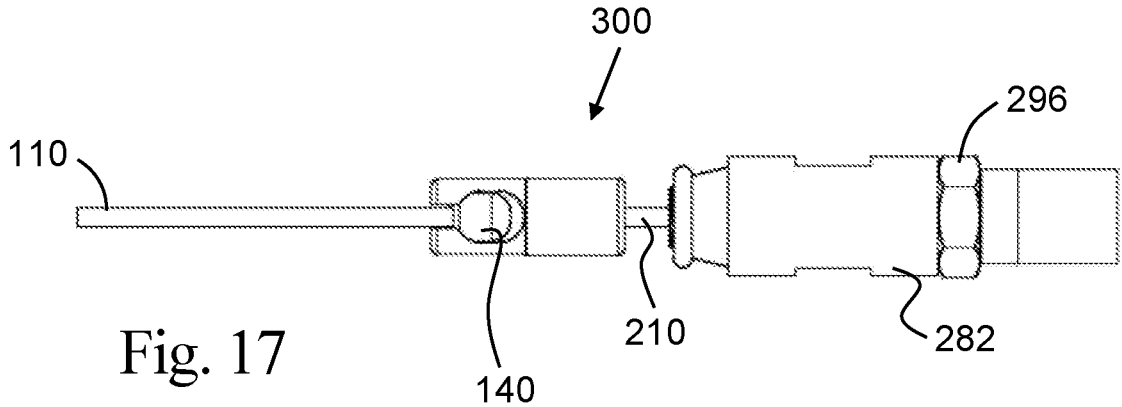

FIG. 17 is a top plan view of the engaged cable coupling assembly of FIG. 16.

Figure 18:
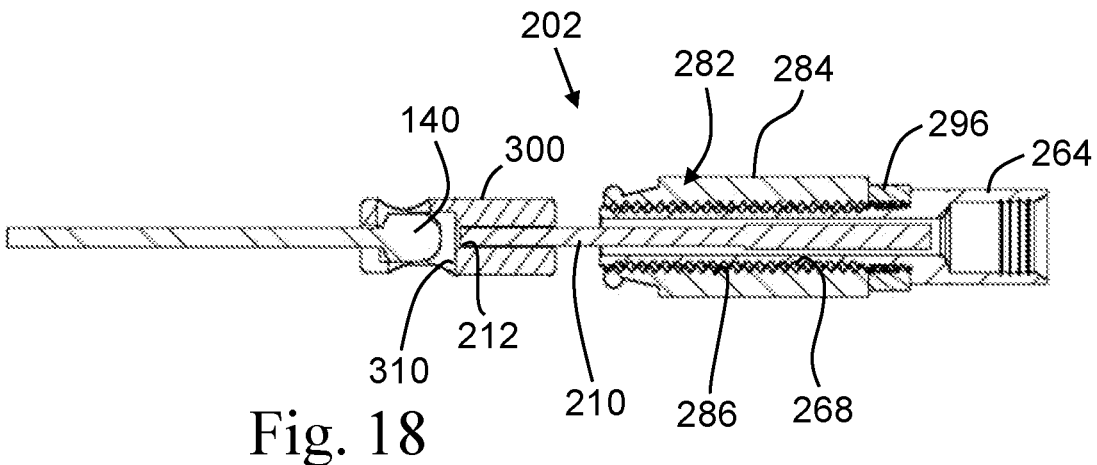

FIG. 18 is a cross sectional view of the engaged cable coupling assembly of FIG. 17.

Figures 19A, 19B, 19C, 20A, 20B, 20C, 21A, 21B, 21C, 22A, 22B, 22C:
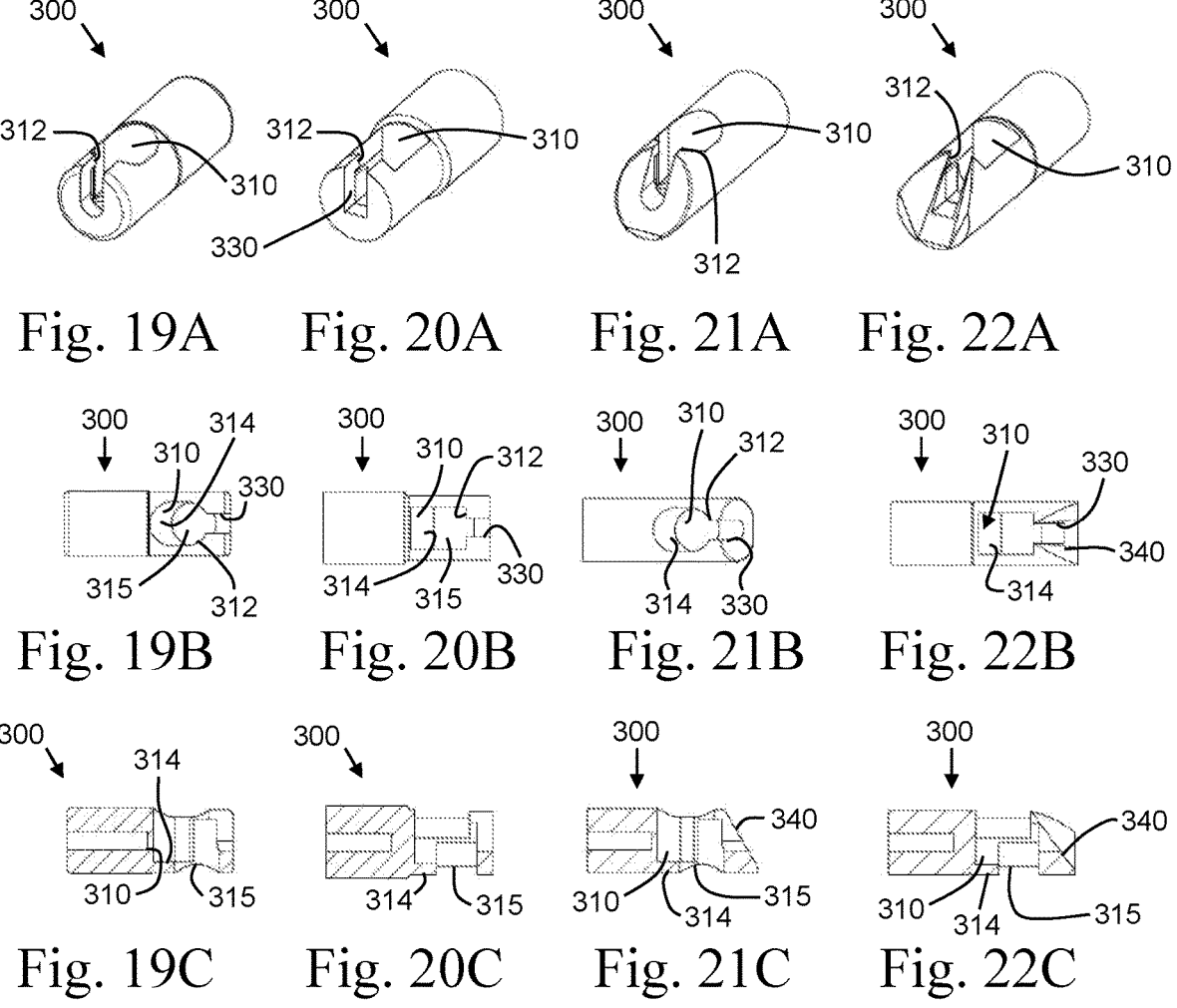

FIGS. 19A, 19B, and 19C are a perspective view, top plan view, and cross sectional view of first configuration of the coupler.

FIGS. 20A, 20B, and 20C are a perspective view, top plan view, and cross sectional view of second configuration of the coupler.

FIGS. 21A, 21B, and 21C are a perspective view, top plan view, and cross sectional view of third configuration of the coupler.

FIGS. 22A, 22B, and 22C are a perspective view, top plan view, and cross sectional view of fourth configuration of the coupler.

Figures 23A, 23B, 23C, 24A, 24B, 24C, 25A, 25B, 25C:
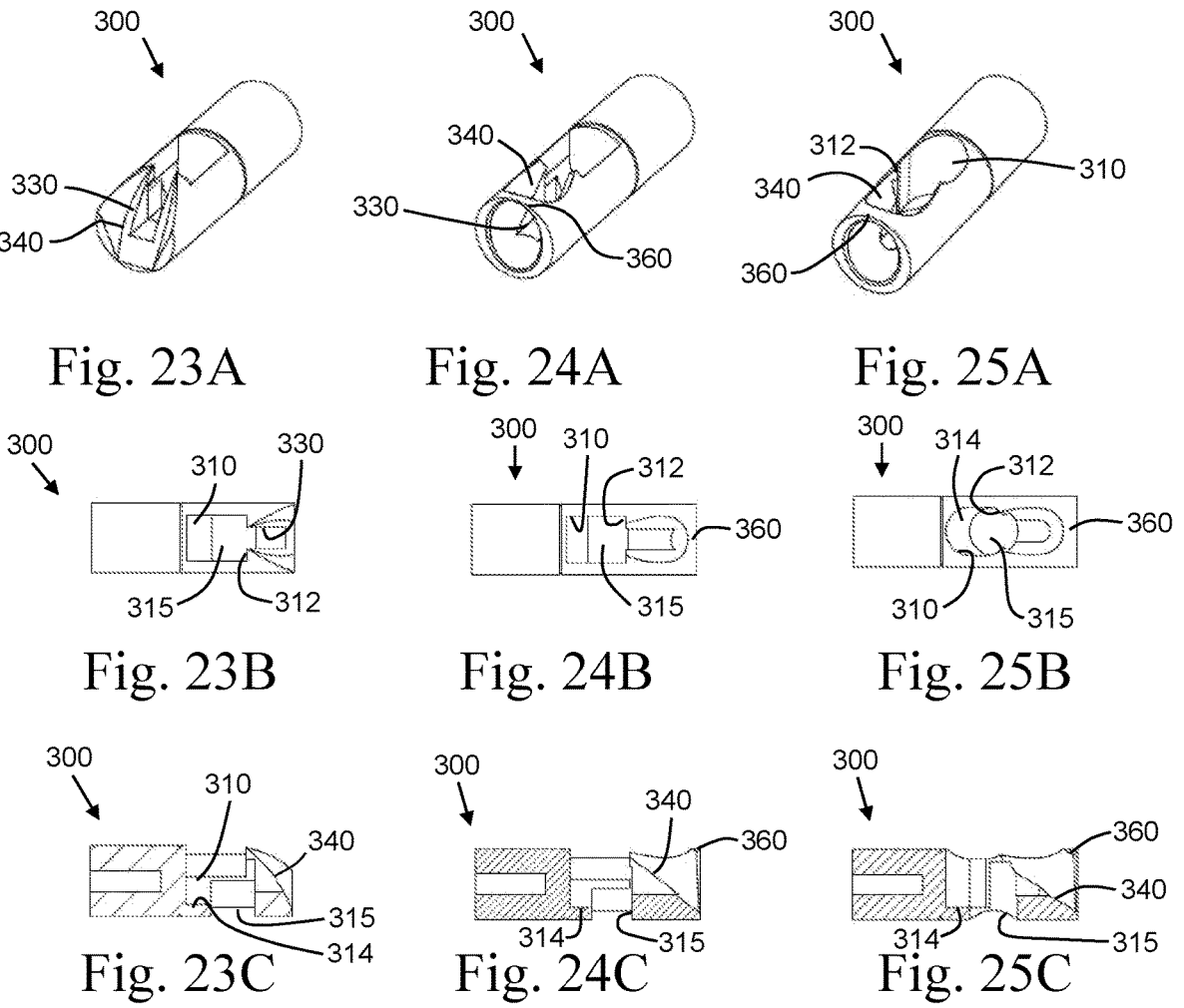

FIGS. 23A, 23B, and 23C are a perspective view, top plan view, and cross sectional view of fifth configuration of the coupler.

FIGS. 24A, 24B, and 24C are a perspective view, top plan view, and cross sectional view of sixth configuration of the coupler.

FIGS. 25A, 25B, and 25C are a perspective view, top plan view, and cross sectional view of seventh configuration of the coupler.

DETAILED DESCRIPTION OF THE INVENTION

Figure 1:
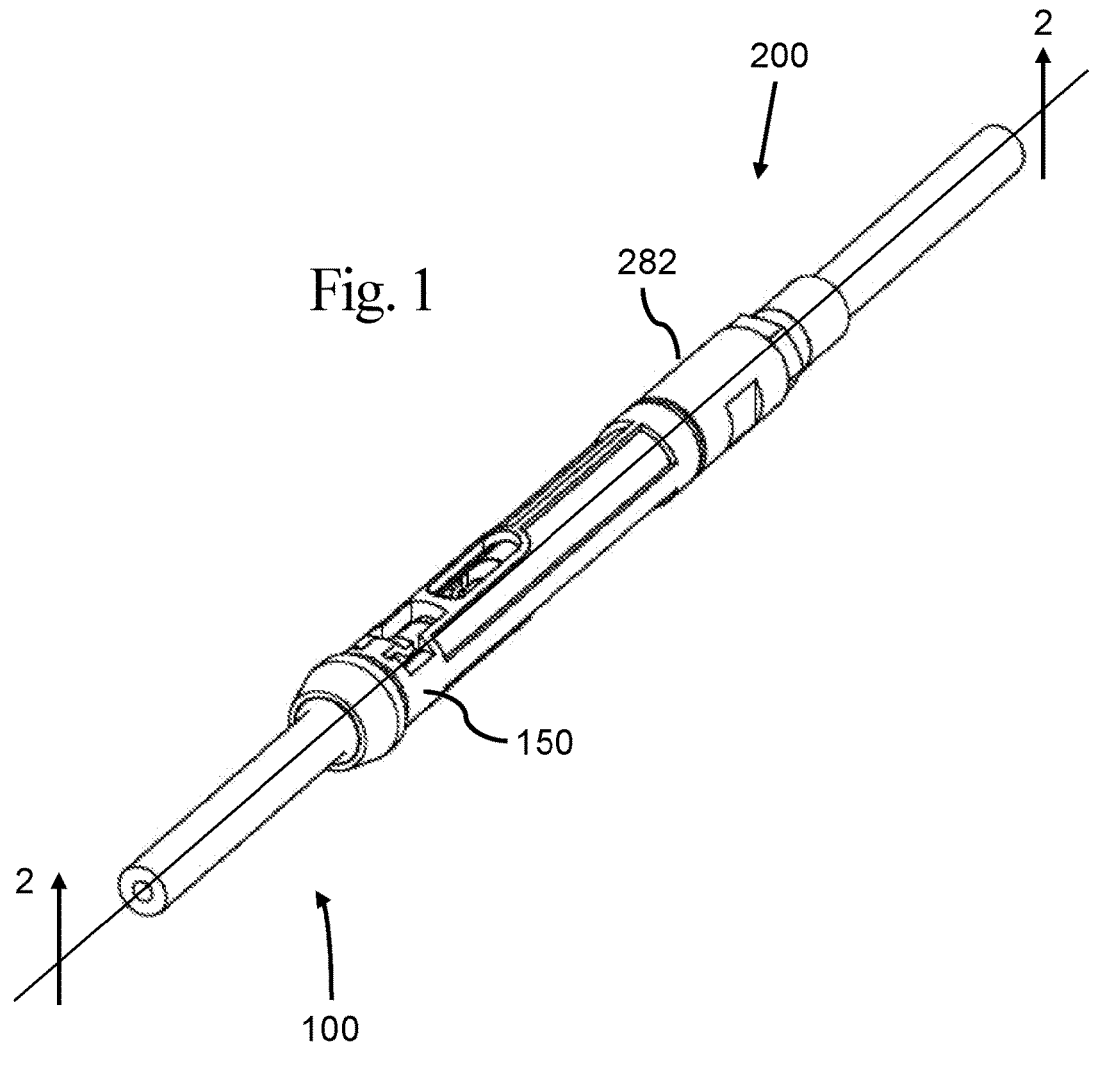
FIG. 1 is a perspective view of a cable coupling assembly coupling two separate lengths of cable.
Figure 7:
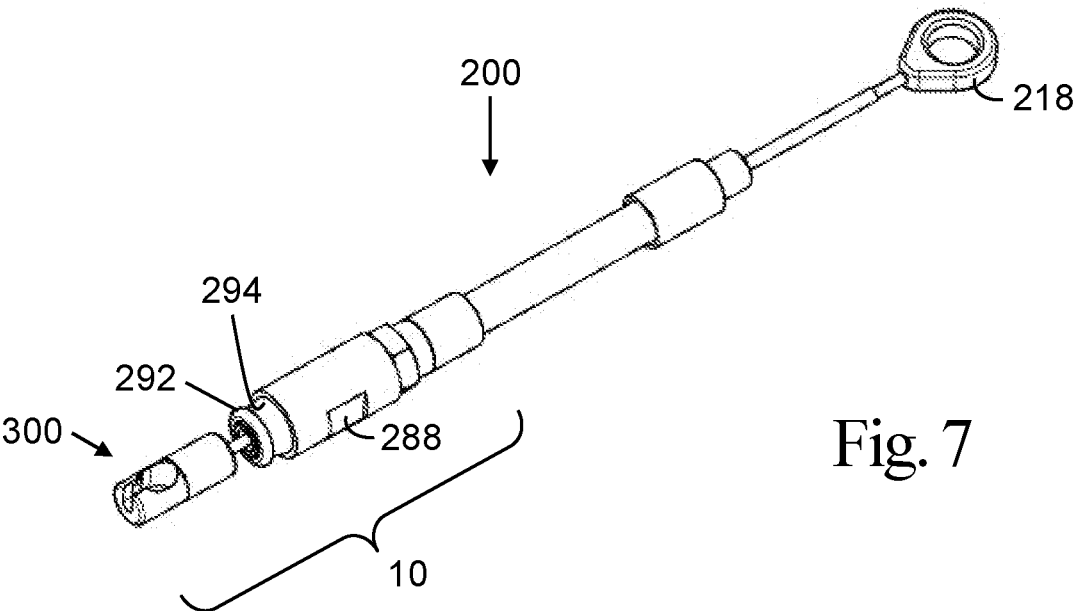
FIG. 7 is a perspective view of the cable coupling assembly in a cable subassembly.
Figure 11:
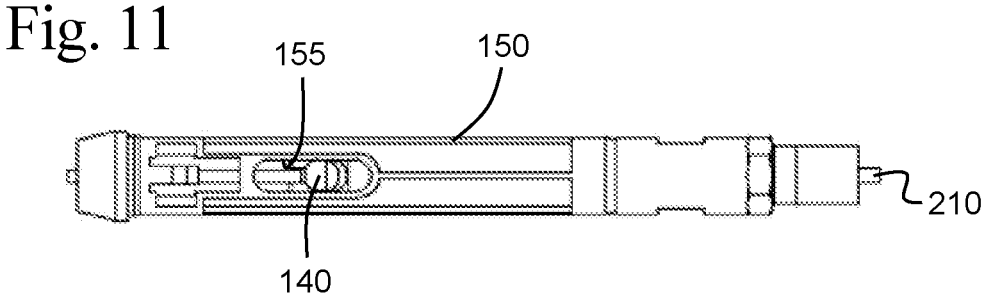
FIG. 11 is a top plan of the cable coupling assembly of FIG. 10.

Generally, as seen in FIGS. 1 and 7, the present disclosure provides a cable coupling assembly 10 for interconnecting a first and second separate cable subassemblies 100, 200. In one configuration, the cable coupling assembly 10 is configured for use in motor vehicles, such as motorcycles and particularly for coupling clutch cables in a motorcycle.

Figure 2:
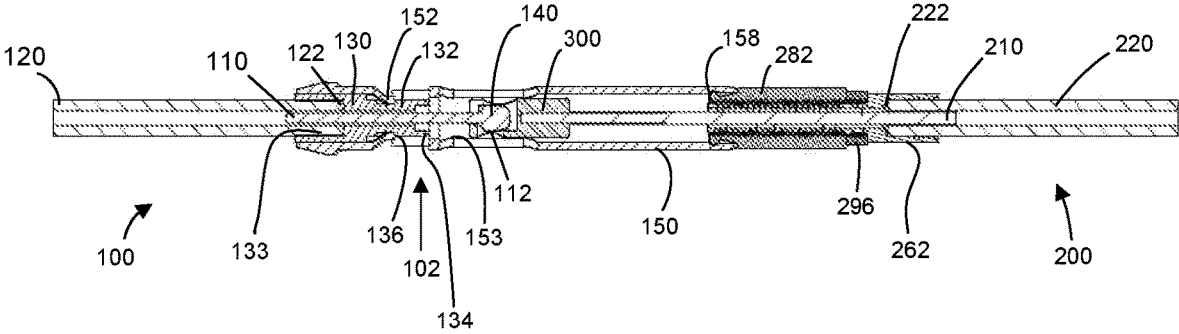
FIG. 2 is a cross sectional view of the cable coupling assembly taken along lines 2-2 of FIG. 1.

Referring to FIGS. 1 and 2, the cable coupling assembly 10 interconnects the first cable subassembly 100 and the second cable subassembly 200, wherein each cable subassembly extends along a respective longitudinal axis.

As seen in FIG. 2, the first and second cable subassemblies 100, 200 include a first and a second core 110, 210 and a first and a second surrounding jacket 120, 220, respectively. While the cable subassembly is shown with the core and the surrounding jacket, it is understood the cable subassembly can include additional layers or sheaths.

In one configuration, the first cable subassembly 100 extends along the longitudinal axis, wherein the first cable subassembly includes the first core 110 and the first jacket 120 surrounding the first core, and wherein the first core is moveable along the longitudinal axis relative to the first jacket. The first cable assembly 100 has a first end 102 with a first end 112 of the first core 110 and a first end 122 of the first jacket 120. The first cable assembly 100 also includes a second end with a second end of the first core 110 and a second end of the first jacket 120.

A first ferrule 130 is affixed to the first end 122 of the first jacket 120, and includes a central passage 133 sized to slidably receive the first core 110. The first ferrule 130 can be affixed to the first jacket 120 by any of a variety of mechanisms known in the art, such as but not limited to swaging, welding, bonding, casting or crimping, depending on the particular material of the first jacket and the ferrule. The first ferrule 130 includes a first end 132 adjacent or connected to the first jacket 120 and a terminal second end 134 longitudinally spaced from the first end. The first ferrule 130 includes a retaining shoulder 136 such as a peripheral groove or channel longitudinally intermediate the first end 132 and the second end 134. In one configuration, the first ferrule 130 is formed of metal, such as but not limited to combinations or alloys of metallic elements.

A first slug 140 is affixed to the first end 112 of the first core 110. The first slug 140 can be affixed to the core by any of a variety of mechanisms known in the art, such as but not limited to swaging, welding, bonding, casting or crimping. In one configuration, the first slug 140 has a dimension transverse to the longitudinal axis sufficient to preclude travel of the slug through the central passage 133 of the first ferrule 130. In one configuration, the slug is formed of metal, such as but not limited to combinations or alloys of metallic elements.

The second end of the first cable assembly is operably connected to the clutch assembly of the vehicle, such as a motorcycle. Typically, the connection to the clutch assembly includes fixing the first jacket to a cover plate that is affixed to the vehicle and connecting the first core to the clutch assembly. Thus, longitudinal movement of the second core imparts movement of the corresponding portion of the clutch assembly.

The first cable assembly 100 further includes an elongate casing 150 connected to the first ferrule 130. The casing 150 defines a housing having a central passage 153 sized to slidably receive the first slug 140, as set forth below. The casing 150 includes a first engaging surface 152 configured to engage the retaining shoulder 136 of the first ferrule 130 and thus longitudinally fix the casing relative to the first ferrule and hence the first jacket 120. However, it is understood the first ferrule 130 and the first engaging surface 152 can have any of a variety of surfaces to mechanically engage, including temporary or releasable engagement as well as engagement that precludes non-destructive separation.

In one configuration, the casing 150 includes at least one, and in certain configurations two bypass apertures 155, wherein the bypass aperture is sized to pass at least a portion of the first slug 140.

Figure 12:
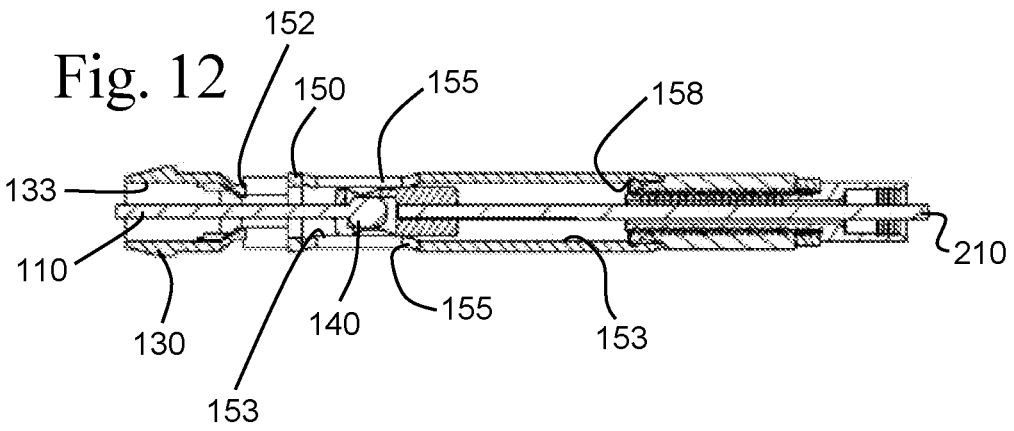
FIG. 12 is a cross sectional view of the cable coupling assembly of FIG. 11.

The casing 150 further includes a second engaging surface 158, such as a detent, channel, seat, groove or shoulder, wherein the second engaging surface is longitudinally spaced from the first engaging surface 152, wherein the bypass aperture 155 is longitudinally intermediate the first engaging surface 152 and the second engaging surface 158. As seen in FIGS. 2, 5, and 12, the second engaging surface 158 is on an inside of the casing 150, exposed to the central passage 153 of the casing.

In one configuration, the casing 150 is between 1 inch and 8 inches long with a satisfactory length being between 2 inches and 6 inches, with a further length of 4 inches. However, depending upon the intended operating environment it is understood the casing 150 can be between 3 inches and 5 inches.

The cable coupling assembly 10 can be disposed on the second cable subassembly 200.

Figure 6:
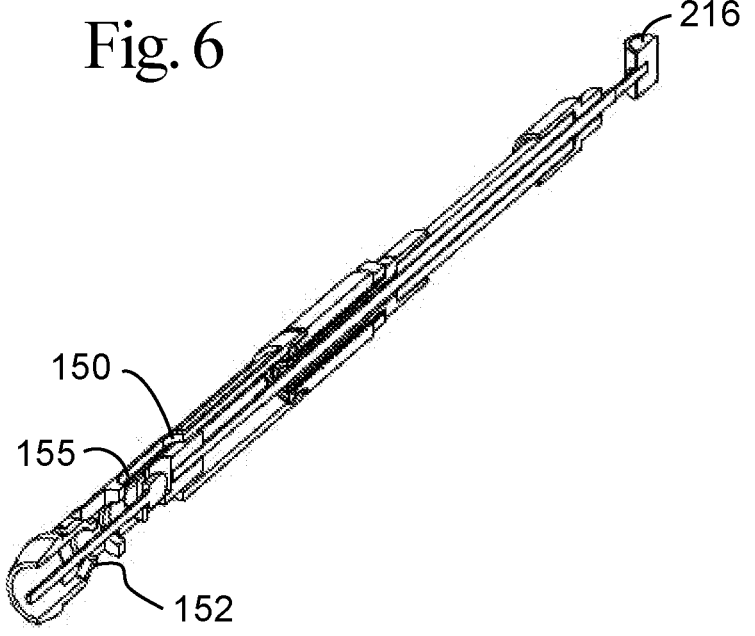
FIG. 6 is perspective view of a further configuration of the cable coupling assembly engaging a portion of a second cable assembly.

The second cable assembly 200 includes a second core 210 and a second jacket 220 surrounding the second core, and wherein the second core is moveable along the longitudinal axis relative to the second jacket. The second cable assembly has a first end 202 with a first end 212 of the second core 210 and a first end 222 of the second jacket 220. The second cable assembly 200 also includes a second end 204 with a second end 214 of the second core 210 and a second end 224 of the second jacket 220. The second end 214 of the second core 210 can include a pin or barrel 216 (FIGS. 6, 8) or an eyelet 218 (FIGS. 3-5, 7).

The cable coupling assembly 10 includes a longitudinal adjuster 260 and a coupler 300.

The longitudinal adjuster 260 includes a ferrule component 262, a compensating component 282, and a lock 296. The ferrule component 262 is affixed to the first end 222 of the second jacket 220. The ferrule component 262 can be affixed to the first end 222 of the second jacket 220 by any of a variety of mechanisms known in the art, such as but not limited to swaging, welding, bonding, casting or crimping. In one configuration, the ferrule component 262 is formed of metal, such as but not limited to combinations or alloys of metallic elements.

In one configuration, the ferrule component 262 includes a ferrule portion 264 and an adjusting portion 266, wherein the adjusting portion can include a plurality of threads 268, such as but not limited male threads.

The compensating component 282 of the longitudinal adjuster 260 includes a main body 284 having a threaded central passage 286 configured to threadingly engage the male threads 268 of the ferrule component 262. Thus, the compensating component 282 can be longitudinally translated relative to the ferrule component 262, and hence the second jacket 220. In one configuration, the main body 284 includes wrench flats 288 on an external surface.

The main body 284 further includes an engagement surface 292 configured to engage the casing 150, and specifically the second engaging surface 158 of the casing. The engagement surface 292 can be any of a variety of configurations, such as but not limited to grooves, channels, or shoulders which can form a detent. In the configuration shown in the Figs., the engagement surface 292 includes a peripheral rib or shoulder, which can be partly defined by a taper 294 in the external surface of the main body 284, where in the engagement surface of the main body and the second engaging surface 158 of the casing 150 forming a detent.

The lock 296 is configured to operatively retain the ferrule component 262 relative to the compensating component 282, thereby at least temporarily affixing the jacket 220 of the second cable subassembly 200 relative to the jacket 120 of the first cable subassembly 100; wherein the compensating component 282 includes the engagement interface 292 configured to provide a mechanical connection, thereby adjusting the effective operative length of the core 210 of the second cable subassembly 200.

The second cable subassembly 200 includes the coupler 300, wherein the coupler is affixed to the second core 210. The coupler 300 can be affixed to the second core 210 to preclude non-destructive separation by swaging, welding, bonding, casting, or crimping. In one configuration, the coupler 300 is affixed to the second core 210 to preclude rotation of the coupler relative to the second core, as well as preclude longitudinal translation of the coupler relative to the second core. Thus, rotational and longitudinal movement of the coupler 300 is dependent on and dictated by movement of the second core 210. That is, in one configuration, there is no independent rotational or longitudinal movement of the coupler 300 relative to the second core 210.

The coupler 300 includes a capture socket 310 and an access passage 330, wherein the access passage extends along the longitudinal axis from the capture socket to an exterior of the coupler. The capture socket 310 is sized to retain the first slug 140 on the first end 112 of the first core 110 and the access passage is 330 sized to slidably receive a portion of the first core 110. The capture socket 310 includes a capture shoulder 312 configured to preclude longitudinal translation of the first slug 140 from the capture socket. The capture shoulder 312 can be configured as a converging wall which converges towards the access passage 330. As seen in FIGS. 19-25, the capture shoulder 312 can include curvilinear or faceted converging wall. In one configuration, the capture socket 310 is configured to locate the first slug 140 and hence the first core 110 to be coaxially aligned with the adjacent portion of the second core 210. It is contemplated the capture socket 310 can include a floor 314 to locate the first slug 140.

While the Figs. show the capture socket 310 including an aperture 315 in the floor 314, the floor can be non-apertured. The aperture 315 in the floor 314 is sized to preclude passage of the first slug 140 through the aperture. The aperture 315 allows access to the first slug 140 in the capture socket 310, wherein the first slug can be readily unseated from the capture socket 310, by virtue of the access through the aperture 315. The formation of the aperture 315 in the floor 314 can also assist in manufacture of the coupler 300 and particularly the capture socket 310.

The coupler 300 can include a ramp or an inclined surface 340 (relative to the longitudinal axis). The ramp 340 includes the access passage 330 for receiving the first core 110 of the first cable subassembly 100. The ramp 340 is configured to urge the first slug 140 from an orientation coaxial with the second core 210, to move up the ramp (away from the longitudinal axis). The ramp 340 can be planar or faceted, including at least one facet to two, three, four, five or six or more facets. Alternatively or in combination, the ramp 340 can include a curvilinear or arcuate surface configured to guide the first slug 140 over the retaining shoulder 312 of the capture socket 310. That is, the ramp 340 urges the first slug 140 away from the longitudinal axis in response to longitudinal movement of first slug along the longitudinal axis.

However, referring to FIGS. 19 and 20, it is understood the coupler 300 can be configured without the ramp 340.

In a further configuration, such as FIGS. 24 and 25, the coupler 300 can include a hoop 360 sized to pass the first slug 140, wherein the ramp 340 is longitudinally intermediate the hoop and the capture socket 310. In one configuration, the hoop 360 has a diameter corresponding to the reminder of the coupler 300.

In operation, the first cable subassembly 100 remains operatively connected to the vehicle, such as the motorcycle and hence connected to the clutch assembly. Specifically, the second end of the first cable assembly 100 is operably connected to the clutch assembly. The first end 102 of the first cable assembly 100 includes the first slug 140 and the first ferrule 130. In addition, the casing 150 is engaged with the first ferrule 130, wherein the first engaging surface 152 of the casing engages the retaining shoulder 136 the first ferrule 130 and longitudinally fixes the casing relative to the first ferrule and hence the first jacket 120.

The coupler 300 is then passed along the central passage 153 of the casing 150 to contact the first slug 140. In in the configurations of the coupler 300 including the ramp 340, further longitudinal movement of the first slug 140 relative to the ramp urges the first slug along the ramp to pass into the capture socket 310. Upon operable location of the first slug 140 within the capture socket 310, the first core 110 is located in the access passage 330 and is coaxial with the second core 210, and the first slug contacts the capture shoulder 312.

In the configurations of the coupler 300 that do not include the ramp 340, upon the coupler approaching the first slug 140, the first slug is passed into or through the bypass aperture 155. The coupler 300 is then advanced to locate the capture socket 310 and the first slug 140 at a common longitudinal position, and the slug is then disposed into the capture socket and the first core 110 passes through access passage 330.

In the configuration of the coupler 300 having the loop 360, upon the coupler advancing to contact the first slug 140, the first slug passes through the hoop to contact the ramp 340 and be urged away from the longitudinal axis until the first slug is longitudinally aligned with the capture socket 310 and then is disposed into the capture socket.

The first slug 140 thus engages the retaining shoulder 136 to preclude longitudinal translation of the first slug away from the coupler 300.

This disclosure has been described in detail with particular reference to an embodiment, but it will be understood that variations and modifications can be affected within the spirit and scope of the disclosure. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed:

1. A cable coupling assembly comprising:
   (a) a length of a cable subassembly extending along a longitudinal axis, the cable subassembly having a core and a jacket surrounding the core, wherein the core is moveable along the longitudinal axis relative to the jacket, and the cable subassembly including a core first end, a jacket first end, a core second end, and a jacket second end;

(b) a longitudinal adjuster having a ferrule component, a compensating component, and a lock; the ferrule component affixed to the jacket first end, the compensating component longitudinally translatable relative to the ferrule component, and the lock configured to operatively retain the ferrule component relative to the compensating component; the compensating component including an engagement interface configured to provide a mechanical connection; and
   (c) a coupler fixed to the core first end to preclude non-destructive separation of the coupler from the first core end, the coupler including a capture socket and an access passage, wherein the access passage extends along the longitudinal axis from the capture socket to an exterior of the coupler.

2. The cable coupling assembly of claim 1, wherein the coupler is fixed to the core first end with at least one of a crimp, a bond, and a weld.

3. The cable coupling assembly of claim 1, wherein the coupler includes a guide surface, the guide surface being inclined relative to the longitudinal axis.

4. The cable coupling assembly of claim 1, wherein the first component of the longitudinal adjuster includes male threads and the second component of the longitudinal adjuster includes female threads.

5. The cable coupling assembly of claim 4, wherein the lock is a nut threadedly engaging the first component.

6. The cable coupling assembly of claim 1, further comprising one of a pin, a barrel, and an eyelet affixed to second end of the core.

7. The cable coupling assembly of claim 1, wherein the coupler is fixed to the first core to preclude longitudinal translation of the coupler relative to the first core.

8. The cable coupling assembly of claim 1, wherein the coupler is fixed to the first core to preclude rotation of the coupler about the longitudinal axis.

9. The cable coupling assembly of claim 1, wherein the coupler is fixed to the first core to preclude longitudinal translation of the coupler relative to the first core and to preclude rotation of the coupler about the longitudinal axis.

10. A cable coupling assembly comprising:
   (a) a length of a first cable subassembly extending along a longitudinal axis, the first cable subassembly having a first core and a first jacket surrounding the first core, wherein the first core is moveable along the longitudinal axis relative to the first jacket;
   (b) a first ferrule affixed to a first end of the first jacket;
   (c) a first slug affixed to a first end of the first core;
   (d) a casing connected to the first ferrule and extending along the longitudinal axis, the casing including an engaging surface spaced from the first ferrule along the longitudinal axis;
   (e) a length of a second cable subassembly extending along the longitudinal axis, the second cable subassembly having a second core and a second jacket surrounding the second core, wherein the second core is moveable along the longitudinal axis relative to the second jacket,
   (f) a longitudinal adjuster having a ferrule component, a compensating component, and a lock; the ferrule component affixed to a first end of the second jacket, the compensating component longitudinally translatable relative to the ferrule component, and the lock configured to operatively retain the ferrule component relative to the compensating component; the compensating component including an engagement surface configured to provide a mechanical connection with the engaging surface of the casing; and (g) a coupler sized to pass along the longitudinal axis within the casing, the coupler fixed to the second core and including (i) a capture socket and (ii) an access passage, wherein the capture socket is sized to receive the first slug and the access passage is sized to slidable receive a portion of the first core.

11. The cable coupling assembly of claim 10, wherein the coupler is fixed to the second core by at least one of a crimp, a bond, and a weld.

12. The cable coupling assembly of claim 10, wherein the coupler includes a guide surface, wherein the guide surface is inclined relative to the longitudinal axis.

13. The cable coupling assembly of claim 10, wherein the ferrule component of the longitudinal adjuster includes male threads and the compensating component of the longitudinal adjuster includes female threads.

14. The cable coupling assembly of claim 13, wherein the lock is a nut threadedly engaging the ferrule component.

15. A method of releasably connecting a first cable subassembly and a second cable subassembly, the method comprising:

(a) passing, a coupler fixed to a core of a second cable subassembly to preclude at least one of rotational and longitudinal movement of the coupler relative to the core of the second cable subassembly, through a length of a casing connected to a ferrule affixed to a jacket of a first cable subassembly;

(b) locating a slug affixed to a core of the first cable subassembly within a capture socket in the coupler; and (c) locking a compensating component of a longitudinal adjuster relative to a ferrule component of the longitudinal adjuster to retain the compensating component at given longitudinal position.

16. The method of claim 15, further comprising engaging the casing with the compensating component of the longitudinal adjuster.

17. The method of claim 15, further comprising releasably engaging the casing with the compensating component of the longitudinal adjuster.

18. The method of claim 15, further comprising, prior to locating the slug, passing the slug at least partly through a bypass aperture in the casing.

19. The method of claim 15, further comprising locating a portion of the core of the first cable assembly in an access passage opening into the capture socket.

\* \* \* \* \*